UNITED STATES PATENT OFFICE.

FREDERIC NEPHEAU BOXER, OF MONTREAL, QUEBEC, CANADA.

COMPOSITION OF MATTER.

SPECIFICATION forming part of Letters Patent No. 430,766, dated June 24, 1890.

Application filed December 26, 1889. Serial No. 334,980. (No specimens.)

*To all whom it may concern:*

Be it known that I, FREDERIC NEPHEAU BOXER, civil engineer, a citizen of Canada, residing in the city of Montreal, Province of Quebec, Canada, have invented a new and useful Composition of Matter to be Used for Rendering Water-Proof and Uninflammable all Substances to which it is Applied, of which the following is a specification.

My composition consists of the following ingredients, mixed in the proportions below given, but varying slightly, according to the strength of the silicate used, and whether it contains alkali or is neutral, viz: silicate of soda (soluble glass) of 30° Baumé, one gallon; pure water, one gallon; whiting, ashes, and pulverized soapstone, fifteen pounds; india-rubber, one pound; paraffine, one-half pound.

The above ingredients are thoroughly mixed together until they form a fine plastic adhesive cement, which hardens quickly, and can be used for cementing together sheets of paper, straw-board, tarred or resined roofing paper or felt, and any other substances to which it will adhere. The same composition, in a more diluted state, can be used to form colored cements, and, with the addition of a small percentage of lime, forms a permanent wash for rendering uninflammable shingle roofs and wood-work.

In mixing the foregoing ingredients I prefer to dilute the fluid silicate with a portion of the required quantity of water specified and apply the balance to moistening the whiting before thoroughly amalgamating them, and then add the rubber and paraffine reduced to liquid form. The india-rubber and paraffine are not dissolved in benzine. Therefore their slight inflammability is counteracted by the silicate and whiting, and their use in the composition is to render it more plastic and water-proof.

My invention is intended to apply more particularly to the following purposes, although there are many other uses to which it could be employed: first, to render common tarred or resined roofing-paper or other inflammable materials flame-proof by cementing them together or by coating them over with the before-described composition; second, for cementing together two or more plies of paper, felt, or straw-board to be used as a substitute for wood or plaster in the interior or on the exterior of buildings; third, as a wash for shingled roofs and wood-work generally; fourth, as a deafening substance under floors when incorporated with sawdust; fifth, as a plastic cement combined with soapstone.

I am aware that silicate has been used before for different purposes; but I am not aware that the same ingredients which compose my composition of matter have been used for the purposes herein described.

What I desire to secure by Letters Patent in the United States is—

The herein-described composition of matter, consisting of soluble glass combined with whiting, ashes, and pulverized soapstone, india-rubber, paraffine, and water, in about the described proportions, as and for the purposes set forth.

FREDERIC NEPHEAU BOXER.

Witnesses:
F. E. BOXER,
A. B. MOORE.